United States Patent Office 2,776,208
Patented Jan. 1, 1957

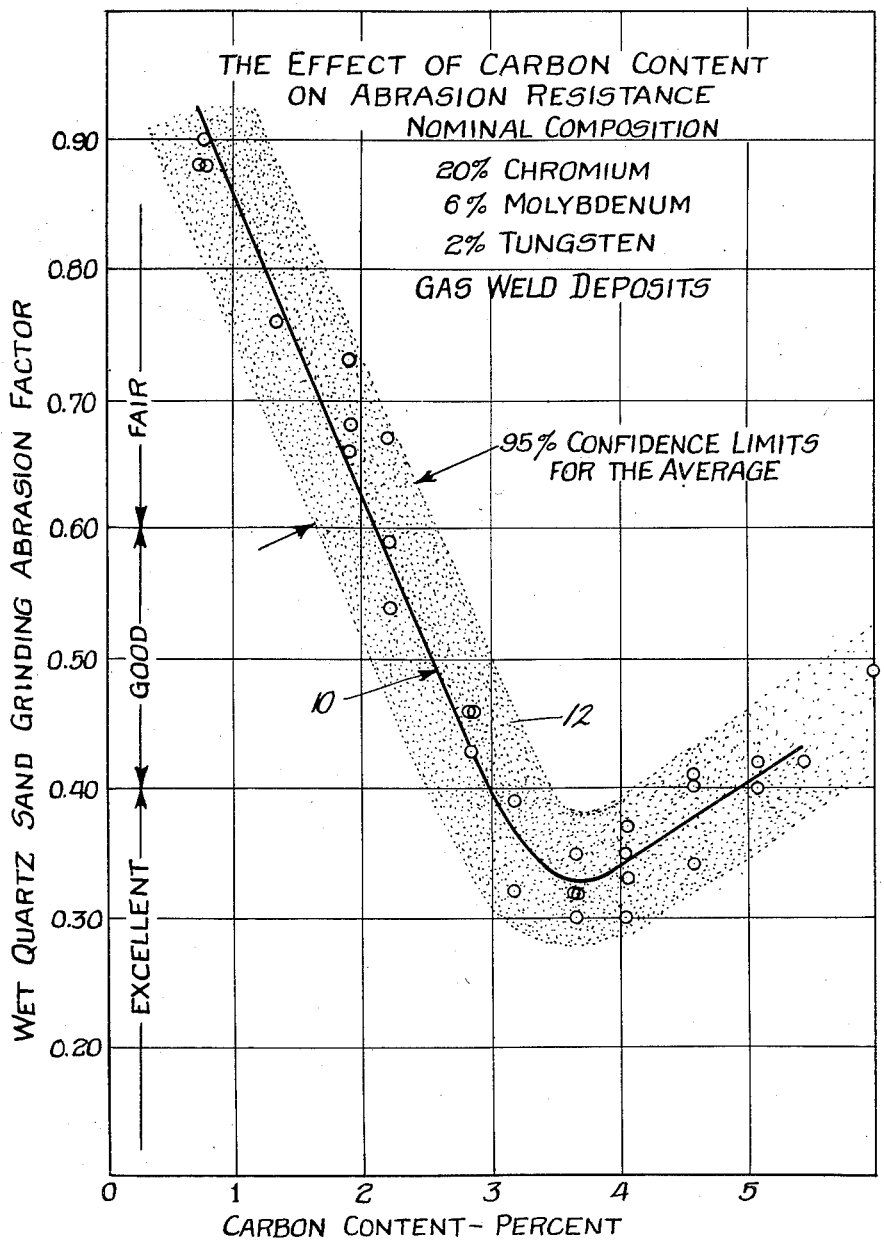

2,776,208

WELDING RODS AND THE HIGH PERFORMANCE HARD FACING ALLOYS PRODUCED THEREBY

Howard S. Avery, Mahwah, N. J., and Charles E. Ridenour, Chicago Heights, Ill., assignors to American Brake Shoe Company, New York, N. Y., a corporation of Delaware Application March 30, 1953, Serial No. 345,423

3 Claims. (Cl. 75—126)

The invention relates to a high performance hard facing alloy and has reference in particular to a ferrous alloy in the class of the martensitic irons which will have improved resistance to abrasion and high compressive strength combined with a relatively low production cost.

In order to protect metal parts subjected to wear it has long been common practice to resort to hard facing alloys as a wear-resistant cover or overlay for the area where excessive wear is focused. The hard and wear-resistant compounds may be prepared in the form of welding rods and applied to the parts by any welding process such as electric arc welding, oxy-acetylene welding and the like so that ease of application outside of manufacturing plants is an important advantage. Economy in the effective use of expensive alloying elements and protection in depth are additional considerations. At least two types of hard facing metals are in general use, namely, the hard carbides and the compounds of ferrous metals. Weld deposits of the first type are produced from composite rods made by enclosing tungsten carbide granules in a mild steel tube. The sheath tubing melts during welding and dissolves both tungsten and carbon to form a hard matrix that anchors the very hard granules in place. Tungsten carbide weld deposits provide the best hard facing material for abrasion resistance. As regards the hard facing alloys of the ferrous type the martensitic irons, the martensitic steels, and the austenitic steels are the best for combating wear.

Accordingly the present invention has for its primary object to provide a new and improved ferrous alloy for hard facing purposes, which will be capable of high performance in use and which will therefore be suitable for the production of small castings where high resistance to abrasion is a controlling factor.

Another object of the invention resides in the provision of welding rods having the required composition for producing the hard facing alloy of the invention by such common welding procedures as the electric arc or the gas flame, and wherein said welding rods may comprise a cast rod best suited for gas welding, a tube rod containing granular filler in a mild steel tube for use either in gas or arc welding, or an electrode consisting of a coating extruded onto a relatively high alloy core wire.

A further object of the invention is to provide a hard facing alloy which will form a good bond with a base metal, and wherein the carbon content of the alloy has been selectively determined on the basis of experimental tests in order to obtain the optimum results as regards resistance to abrasion.

Another object is to provide a hard facing alloy which can be applied by known welding methods for surfacing, resurfacing or repairing metal parts that are exposed to excessive wear, and wherein a high resistance to abrasion is secured without the necessity of subjecting the welded parts to heat treating procedures.

Mechanical wear is the result of stress. If the stresses are applied through hard particles, usually of a foreign and non-metallic material, the wear is typed as erosion or abrasion. For simplicity erosion can be classed as scratching abrasion, a low-stress phenomenon. Grinding is a high-stress abrasion as where machine parts rub in a gritty environment or in actual grinding operations as in ball mills, and gouging abrasion implies high stress on a gross scale with associated impact.

Therefore another object of the invention is to provide an alloy primarily adapted for utilization as a hard facing and wear-resistant overlay, wherein said alloy has outstanding ability in resisting abrasion, and wherein the high performance of the alloy as regards this property is such that the alloy is an efficient substitute for the tungsten carbide compounds in combating high stress abrasion as well as low stress abrasion.

In the production of the welding rods and other small articles formed of the present alloy by casting procedures, the following composition with the ranges as specified has been found to give satisfactory results:

|  | Percent |
|---|---|
| Carbon | 2.5–6.0 |
| Chromium | 18.0–22.0 |
| Molybdenum | 4.0–8.0 |
| Tungsten | 1.0–3.0 |
| Vanadium | 0–1.5 |
| Manganese | 1.0% max. |
| Silicon | 2.0% max. |
| Balance | Iron |

For a more limited composition the following may be considered typical:

|  | Percent |
|---|---|
| Carbon | 4.5 |
| Chromium | 20.0 |
| Molybdenum | 6.0 |
| Tungsten | 2.0 |
| Vanadium | — |
| Manganese | 0.5 |
| Silicon | 1.0 |
| Balance | Iron |

Evidence gained as a result of laboratory tests indicate that a slightly different composition may be required, depending on the welding method used. The formula given above applies to cast welding rods and to fabricated tubular rods designed for gas welding and to castings to be used as such. Gas welding may add carbon but has little, if any, effect on the other ingredients and does not ordinarily involve appreciable dilution by the base metal. Arc welding, however, can cause oxidation of some or all of the ingredients in the rod itself, and the matter of base metal dilution may have a considerable influence on properties of the deposit. This last explains why deposits that differ in thickness may have different levels of abrasion resistance.

Accordingly, the following composition with the ranges as specified is proposed for welding rods designed for arc application and which may be produced as fabricated filled tubes, coated cast rods, or as composite electrodes with the alloying elements in either or both the drawn core wire and the coating:

|  | Percent |
|---|---|
| Carbon | 3.0–7.0 |
| Chromium | 18.0–23.0 |
| Molybdenum | 4.0–9.0 |
| Tungsten | 1.0–3.0 |
| Vanadium | .0–1.5 |
| Manganese | 1.0% max. |
| Silicon | 2.0% max. |
| Balance | Iron |

The present alloy is characterized by having chromium, tungsten and molybdenum as the essential alloying elements, and by having a range for its carbon content which identifies the alloy as a cast iron of the martensitic type. Current production schedules for a commercial welding rod call for a molybdenum high speed steel core with an extruded coating that contains graphite and high-carbon chromium as essential alloying elements. The weld deposit should have a composition within the permissive ranges as follows:

| | Percent |
|---|---|
| Carbon | 3.0–5.5 |
| Chromium | 20.0–22.0 |
| Molybdenum | 4.5–6.5 |
| Tungsten | 1.5–2.5 |
| Vanadium | 0.5–1.0 |
| Manganese | 0.1–0.5 |
| Silicon | 0.5–1.5 |
| Balance | Iron |

A typical composition for the weld deposits as produced by arc welding is as follows:

| | Percent |
|---|---|
| Carbon | 4.5 |
| Chromium | 20.4 |
| Molybdenum | 5.4 |
| Tungsten | 1.8 |
| Vanadium | 0.7 |
| Manganese | 0.3 |
| Silicon | 0.9 |
| Balance | Iron |

A series of small laboratory melts were made to survey the effect of the carbon content on the abrasion resistance of the present alloy when laid down as a weld deposit. The results have been plotted on the chart as shown in the drawing. The nominal composition for the melts included chromium 20%, molybdenum 6% and tungsten 2%. Only the carbon content of the melts was determined after melting and it was found that twelve compositions bracketed the range from 0.78% carbon to 6.00% carbon. Cast welding rods were produced from the melts respectively and the welding rods in turn were used in a gas welding operation to form a series of weld deposits for testing. The tests included well known laboratory procedure for ascertaining the resistance of each weld deposit to wet sand grinding abrasion. The tests were repeated generally three times to establish the statistical significance of the pertinent comparisons.

Referring to the chart, it will be understood that the line 10 has been plotted on the basis of averages, and that the shaded zone 12 represents the 95% confidence limits of the averages as calculated by statistical methods from the average ranges of the groups of three and four tests. The carbon range for the present alloy of 2.5% to 6.00% provides an expectancy of better than 0.50 abrasion factor, and with a narrowing of the carbon content to between 3.00% and 5.00% the abrasion factor is 0.40 or better.

On the basis of the wet sand abrasion tests as conducted for determining the optimum carbon content, it can be pointed out that the present hard facing alloy very closely approaches the abrasion resisting properties of expensive tungsten carbide materials which develop factors within the range of 0.15 to 0.45.

While the invention has been described in detail, we do not limit ourselves to the exact formulae given but reserve the right to employ such variations or equivalents that can be said to fall within the scope and spirit of the following claims.

What is claimed is:

1. A ferrous hard facing alloy of chromium, molybdenum and tungsten having a high resistance to abrasion and containing the following elements in the proportions as stated:

| | Percent |
|---|---|
| Carbon | 3–5.5 |
| Chromium | 20–22 |
| Molybdenum | 4.5–6.5 |
| Tungsten | 1.5–2.5 |
| Vanadium | 0.5–1 |
| Manganese | 0.1–0.5 |
| Silicon | 0.50–1.5 |
| Balance | Iron |

2. A ferrous hard facing alloy having a high resistance to abrasion, said alloy being deposited by a welding operation and containing the following elements approximately in the proportions as stated:

| | Percent |
|---|---|
| Carbon | 4.5 |
| Chromium | 20.4 |
| Molybdenum | 5.4 |
| Tungsten | 1.8 |
| Vanadium | 0.7 |
| Manganese | 0.3 |
| Silicon | 0.9 |
| Balance | Iron |

3. A dense, completely fused martensitic type cast ferrous base welding rod alloy consisting essentially only of the following materials in the percentages indicated, by weight:

| | Percent |
|---|---|
| Chromium | 18–22 |
| Molybdenum | 4–8 |
| Tungsten | 1–3 |
| Vanadium | 0.5–1.5 |
| Carbon | 2.5–6 |
| Iron | Balance |

References Cited in the file of this patent
UNITED STATES PATENTS

| 1,778,226 | Nelson | Oct. 14, 1930 |
| 1,977,361 | Taylor et al. | Oct. 16, 1934 |
| 2,268,426 | Schlumph et al. | Dec. 30, 1941 |